Nov. 8, 1966  O. G. TJADEN  3,284,041

HOLDING DEVICE

Filed June 14, 1965

INVENTOR.
OWEN G. TJADEN
BY *MaiMoody*
ATTORNEY 3,284,041
HOLDING DEVICE
Owen G. Tjaden, 607 Hillcrest Drive,
Monticello, Iowa
Filed June 14, 1965, Ser. No. 463,491
1 Claim. (Cl. 248—311)

This invention relates in general to holding devices, and in particular, to a new and novel holder for tissues.

It is oftentimes desirable to provide a supply of paper tissues in an auto or truck so that children and adults may have a handy source of tissues. It is desirable that such tissues be available without being placed in the glove compartment or on the dash or on the rear window ledge.

It is an object of the present invention to provide a novel holder that can be attached to the roof of an auto or truck and which is adapted to hold a box of paper tissues which are readily available for the occupants of the vehicle.

Another object is to provide a tissue box holder which is adaptable to receive boxes of different sizes.

Yet another object is to provide a tissue box holder which fits flat against the headliner of a vehicle and which does not present a hazard.

A feature of this invention is found in the provision for a tissue box holder formed with a pair of arms that may be inserted into a box of tissues and which can be attached to the roof of a vehicle such that it rests against the headliner.

Figure 1:
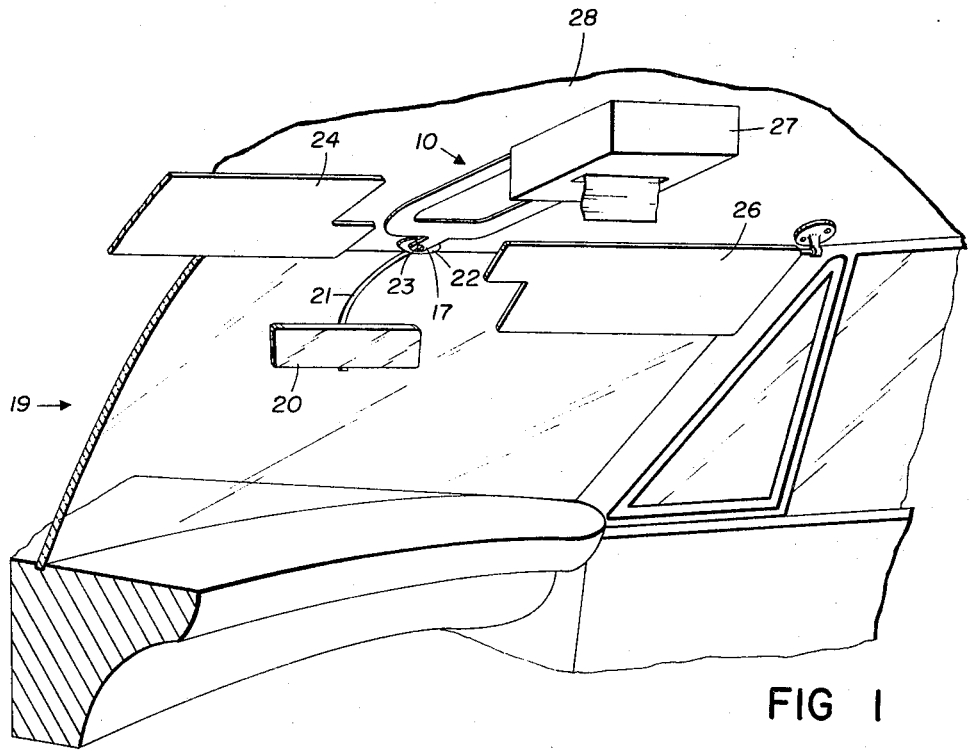
Figure 2:
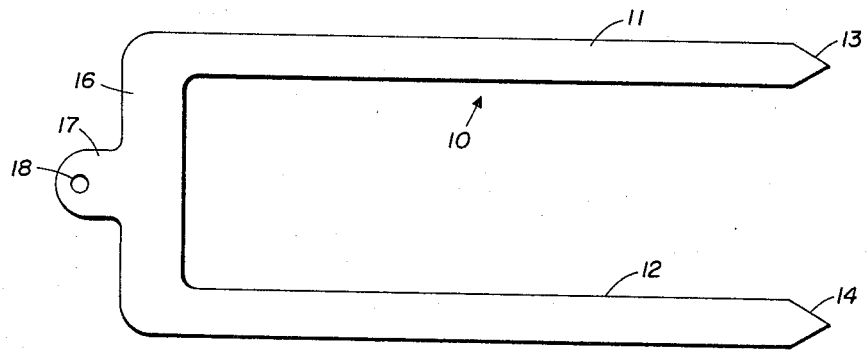

Further objects, features, and advantages will become apparent from the following description and claim when read in view of the drawings; in which, FIGURE 1 is a perspective view of the tissue holder of this invention mounted in a vehicle, and, FIGURE 2 is a plan view of the tissue holder.

FIGURE 1 illustrates the tissue holder 10 of this invention mounted against the headliner 28 of a vehicle 19. The vehicle has a rear view mirror 20 which is supported by a rod 21 that is attached to a bracket 22 by a set screw 23. A pair of sun visors 24 and 26 are also attached to the headliner 28 of the vehicle.

As best shown in FIGURE 2 the tissue holder 10 is formed of thin material such as aluminum or other suitable material and has a pair of legs 11 and 12 which have points 13 and 14. The other ends of the legs are joined by a cross-portion 16 which has an extension 17 formed with an opening 18.

The holder 10 is mounted to the vehicle by removing set screw 23 and inserting it through opening 18 of the holder and replacing and tightening the set screw to hold the bracket 22 and holder.

The holder 10 will press toward the headliner 28 of the vehicle but will easily accept a carton 27 of tissues on legs 11 and 12. The points 13 and 14 easily pierce the carton of the tissues adjacent its bottom to hold it and without damaging tissues in the carton. The carton is placed on the arms such that the opening for withdrawing tissues is downwardly to allow the tissues to be removed.

Tissue cartons come in sizes of varying lengths and the arms 10 and 11 are long enough to accept the various sizes. A small size carton is shown in FIGURE 1 by way of example.

It is to be noted that the arms 11 and 12 are closely adjacent the headliner such that the points 13 and 14 do not provide a hazard to occupants of the vehicle. The placement of the tissue carton as shown makes the tissues readily available to all occupants but does not take up any useable room in the vehicle. Also the placement is such that the carton does not obstruct the vision of the driver.

The holder 10 may also be attached to the dome light bracket if desired. Many of the dome lights have a bracket with a set screw which can be removed to hold the holder 10.

It is seen that this invention comprises a holder for tissue cartons for a vehicle and although it has been described with respect to a preferred embodiment, it is not to be so limited as changes and modifications can be made which are within the full intended scope as defined by the appended claim.

I claim:

A carton holder comprising a body portion of a single flat sheet material of H-shape with pointed arms and an apertured extension adapted to be attached to the headliner of a vehicle and formed with a carton receiving portion which extends from the main body portion and upon which a carton may be placed in the longitudinal position, said carton receiving portion having a pair of arms which extend outwardly and are spaced apart a distance such that they tightly fit into the carton to hold it firmly and such arms being of a length to extend substantially the entire length of the carton and the main body portion being connectible to the vehicle adjacent the headliner so that the arms and carton are firmly held in position against the headliner.

References Cited by the Examiner
UNITED STATES PATENTS

| | | | |
|---|---|---|---|
| 1,399,960 | 12/1921 | Harding | 248—300 X |
| 1,614,349 | 1/1927 | Daley | 248—303 |
| 1,824,710 | 9/1931 | De Carlo | 211—31 |
| 2,315,573 | 4/1943 | Yaffa | 248—309 |
| 2,515,523 | 7/1950 | Mancino | 248—311 |
| 2,643,046 | 6/1953 | Humphreys | 248—311 X |
| 2,991,036 | 7/1961 | Morgan et al. | 248—206 |
| 3,046,049 | 7/1962 | Paxton | 211—37 X |

FOREIGN PATENTS 65,795  11/1955  France.

CLAUDE A. LE ROY, Primary Examiner.